United States Patent
Richard et al.

(10) Patent No.: US 8,776,665 B2
(45) Date of Patent: Jul. 15, 2014

(54) BRAKE INSTALLATION WITH MASTER CYLINDER AND BRAKE BOOSTER BUT NO PUSH ROD

(75) Inventors: Philippe Richard, Chelles (FR); Francois Gaffe, La Turballe (FR); Bastien Cagnac, Cramoisy (FR)

(73) Assignee: Robert Bosch GmbH, Stuttgart (DE)

( * ) Notice: Subject to any disclaimer, the term of this patent is extended or adjusted under 35 U.S.C. 154(b) by 940 days.

(21) Appl. No.: 12/906,298

(22) Filed: Oct. 18, 2010

(65) Prior Publication Data

US 2011/0094218 A1 Apr. 28, 2011

(30) Foreign Application Priority Data

Oct. 22, 2009 (FR) .................................... 09 05089

(51) Int. Cl.
*B60T 11/18* (2006.01)
(52) U.S. Cl.
USPC ........................................................ 91/369.2
(58) Field of Classification Search
USPC ............................................ 91/369.2, 376 R
See application file for complete search history.

(56) References Cited

U.S. PATENT DOCUMENTS 3,110,031 A * 11/1963 Price ............................. 91/369.2
4,256,016 A * 3/1981 Thomas ....................... 91/369.2
4,282,799 A * 8/1981 Takeuchi ...................... 91/369.2
4,433,614 A * 2/1984 Takeuchi et al. ............. 91/376 R
4,892,027 A 1/1990 Wagner et al.
2006/0055235 A1 3/2006 Bacardit et al.

FOREIGN PATENT DOCUMENTS

FR 2840273 12/2003
FR 2849818 7/2004

OTHER PUBLICATIONS

FR 0905089 Search Report.

* cited by examiner

*Primary Examiner* — Thomas E Lazo
(74) *Attorney, Agent, or Firm* — Michael Best & Friedrich LLP

(57) ABSTRACT

Brake installation consisting of a master cylinder associated with a brake booster furnished with a motor driving an actuator piston and acting on the primary piston of the master cylinder by means of a reaction disk against which the piston rests. For a safety operation, the hydraulic actuator connected to the control rod actuated by the brake pedal rests on the rear face of the reaction disk. The actuator piston is combined with an auxiliary piston in order to interact with the reaction disk and it is guided by its sleeve-shaped portion in a bore of the body of the brake booster. An adapting shim is supported by the auxiliary piston in order to receive as a support the end of a rear rod, secured to the primary piston of the master cylinder. The thickness of the assembly formed by the adapting shim and the auxiliary piston is defined on mounting of the master cylinder and of the brake booster as a function of the free travel measured previously.

9 Claims, 2 Drawing Sheets

BRAKE INSTALLATION WITH MASTER CYLINDER AND BRAKE BOOSTER BUT NO PUSH ROD

BACKGROUND OF THE INVENTION

The present invention relates to a brake installation with master cylinder and brake booster but no push rod and notably a brake installation with master cylinder associated with a brake booster comprising an actuator piston controlled by the motor of the brake booster and acting on the primary piston of the master cylinder by means of a reaction disk against which the primary piston rests and also, if necessary, for a safety operation, the hydraulic actuator connected to the control rod actuated by the brake pedal.

Brake systems with master cylinder and brake booster use, at the connection between the actuator piston of the brake booster and the piston (primary piston) of the master cylinder, a connection via a push rod pressed against the reaction disk, on the side of the master cylinder. This push rod is a part of complex shape consisting of two portions: a mushroom-shaped rear portion, the flat head of which is pressed against the whole front face, on the side of the master cylinder, of the reaction disk and which supports a second part, inserted into the rod of the first in order to press against the bottom of the primary piston.

When the master cylinder and the brake booster are assembled, the free travel between the reaction disk of the actuator and the primary piston is first measured and the length of the push rod is adapted by compressing it as a function of what is necessary to limit the free travel.

This action, relatively complicated and costly to apply, is necessary because of the manufacturing and installation tolerances which exist at the actuator piston.

SUMMARY OF THE INVENTION

The object of the present invention is to develop a brake system with master cylinder and brake booster with actuator piston furnished with a reaction disk so as to simplify the interaction between the actuator piston and the primary piston of the master cylinder in normal operation and also in safety operation when the hydraulic actuator of the brake booster acts on the primary piston of the master cylinder by means of the reaction disk.

Accordingly, the present invention relates to a brake system of the type defined above characterized in that:
the actuator piston combined with an auxiliary piston in order to interact with the reaction disk on the side of the master cylinder, is guided in a bore of the body of the brake booster,
an adapting shim supported by the auxiliary piston is designed to receive the end of a rear rod secured to the primary piston of the master cylinder,
the thickness of the adapting shim being defined on mounting of the master cylinder and of the brake booster as a function of the free travel measured previously.

The invention makes it possible to simplify overall the production of the brake system by virtue of reducing the axial defect and the defect of coaxiality of the actuator piston relative to the master cylinder. This reduction of tolerances makes it possible to act directly on the primary piston by means of the reaction disk by virtue of the primary piston the rear portion of which rests against the adapting shim of the auxiliary piston; the auxiliary piston with its adapting shim being adjusted in thickness as a function of the free travel determined before assembly of the brake booster and the master cylinder.

In general, the free travel is due to the closure of the hydraulic circuits in the master cylinder. The free travel is specifically synonymous with hydraulic free travel or free travel in the master cylinder.

In certain manufacturing conditions, it is preferable to standardize the manufacture of the auxiliary piston and to add to the latter adapting shims of different thickness. But other particular solutions can be envisaged according to the invention in order to adapt this thickness to the previously-measured free travel as will be seen below.

Overall, the invention makes it possible to reduce the cost of machining the master cylinder piston since there is machining only on a single side and the push rod is dispensed with.

According to another advantageous feature, the adapting shim is incorporated into the auxiliary piston so as to form only one part. On mounting of the installation, after the free travel has been measured, the adapting shim/auxiliary piston assembly is chosen of which the thickness corresponds to the free travel.

According to another feature, the adapting shim is machined as a function of the measured free travel in order to adjust the distance between the primary piston rod and the actuator piston, that is to say the gap between the end of the primary piston rod and the face on the master cylinder side of the reaction disk.

This makes it possible to effectively compensate for the defects in the free travel in the general case mentioned above or in the particular cases of the adapting shim simplifying the manufacture of the various parts and their mounting. This makes it possible, for example, to have, in the master cylinder, a free travel of the order of 1.2±0.1 mm.

According to an advantageous feature, the actuator piston consists of a front collar, situated on the side of the master cylinder and defining a housing receiving the reaction disk and the auxiliary piston and its adapting shim, the rear face of the reaction disk being exposed in the bore of the sleeve of the actuator piston in order to receive the hydraulic actuator and be separated therefrom by the skip distance.

This embodiment allows particularly effective guidance of the actuator piston while using its length serving for the guidance of the hydraulic actuator, by virtue of the external periphery of the sleeve guided in a bore of the body of the casing of the booster so as to ensure the alignment along the axis of the system and allow effective and simple compensation for the free travel between the master cylinder and the brake booster.

BRIEF DESCRIPTION OF THE DRAWINGS

The present invention will be described in greater detail with the aid of an exemplary embodiment shown in the appended drawings in which.

DETAILED DESCRIPTION

Figure 1:
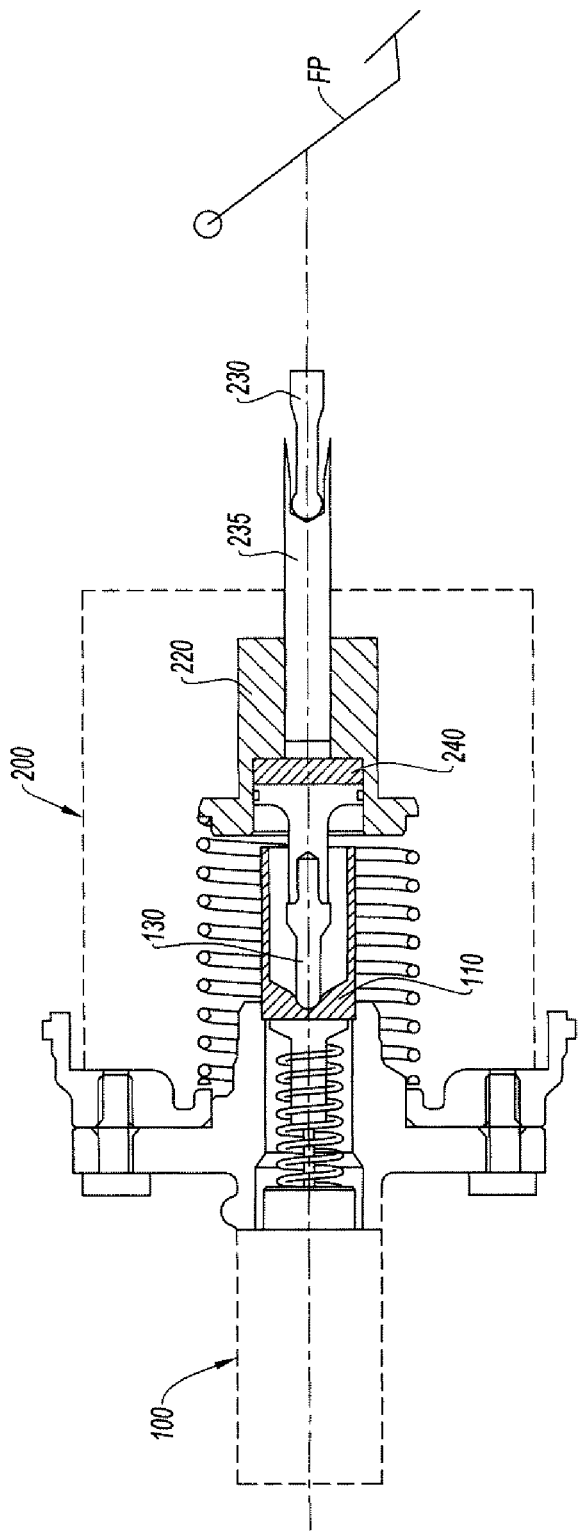
FIG. 1 is a partial schematic section of a brake system with master cylinder and brake booster according to the prior art.

The references listed hereinbelow correspond to the various elements of the method according to the invention and of the devices that implement this method:
100—master cylinder
110—primary piston 111—rear rod
115—auxiliary piston
116—adapting shim
130—push rod
200—brake booster
202—guide bore
201—brake booster body
220—actuator piston
221—collar
222—sleeve
223—housing
224—bore
230—control rod
235—hydraulic actuator
240—reaction disk
240AV—front face
240AR—rear face
300—motor
FP—brake pedal
XX—axis
S—skip FIG. 1 shows a brake system fitted with a master cylinder and a brake booster according to the prior art, in order to make the description and presentation of the invention easier.

This brake system consists of a master cylinder 100, in this instance a tandem master cylinder, combined with a brake booster 200. All that is shown of the master cylinder is its portion associated directly with the brake booster and all that is shown of the latter is its actuator piston 220, housing the reaction disk 240 in order to press on the primary cylinder 110 of the master cylinder by means of a push rod 130, and the hydraulic actuator 235 with the control rod 230 itself connected to the brake pedal FP. The various means such as the detector of movement of the hydraulic actuator 235 and/or of the control rod 230 in order to apply the brake booster 200 are not shown. Also not shown is the brake-booster motor which controls the movement of the actuator piston 220 as a function of the movement signal collected at the hydraulic actuator and/or at the control rod.

Figure 2:
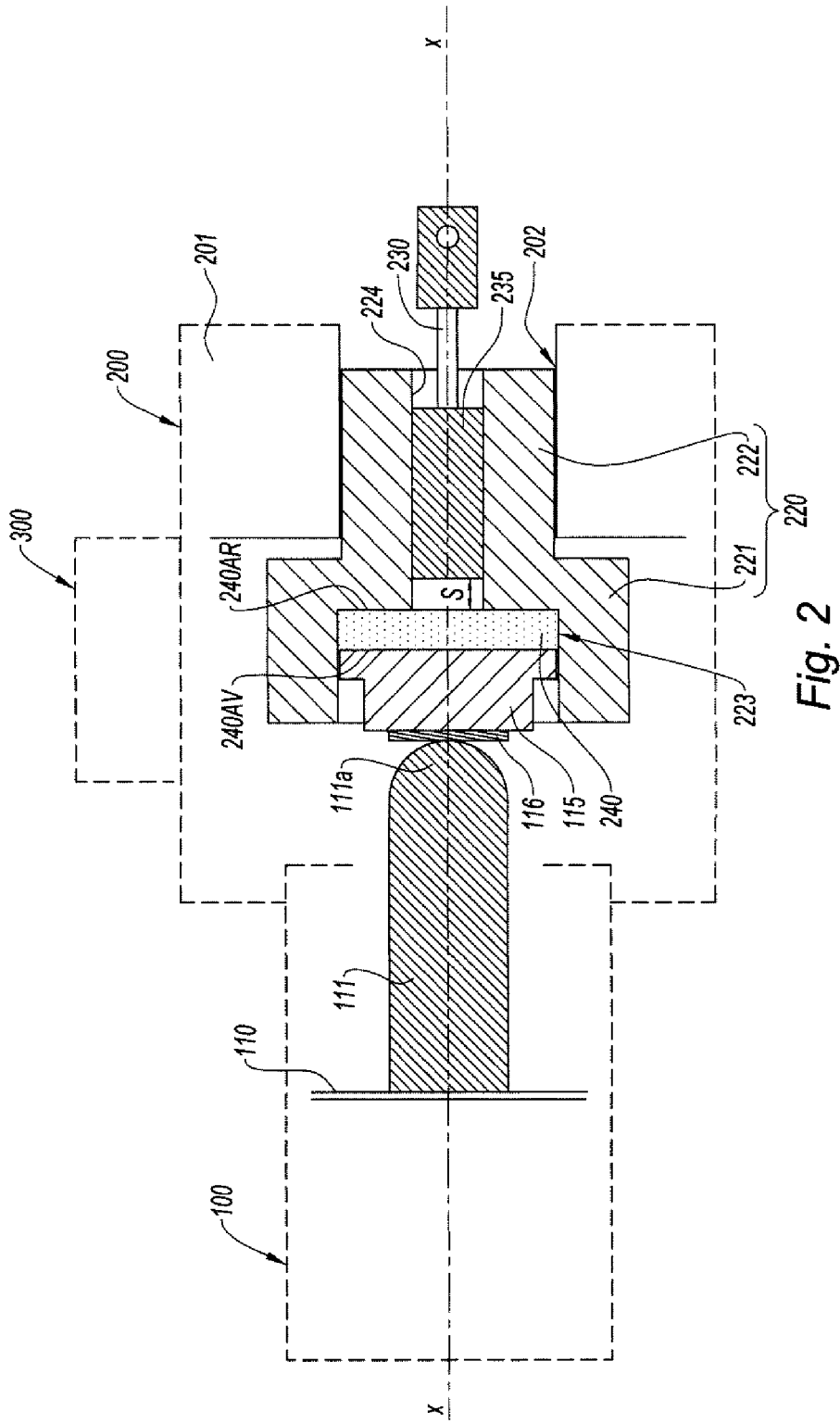
FIG. 2 is a schematic view on a larger scale of a portion of a brake system with master cylinder and brake booster according to the invention, shown in axial section.

In FIG. 2, the brake system with brake booster according to the invention consists of a master cylinder 100 the primary piston 110 of which is furnished on its rear face with a rear rod 111, directed toward the brake booster 200. The brake booster 200 consists of a brake-booster body 201, not detailed, with a motor 300 to drive an actuator piston 220 consisting of two portions: a front portion with a collar 221 on the side of the master cylinder 100 and a sleeve-shaped rear portion 222 sliding in a guide bore 202 made in the body 201 of the brake booster 200. The collar 221 forms a housing 223 receiving the reaction disk 240 against which, on the side of the master cylinder (left side), an auxiliary piston 115 furnished with an adapting shim 116 rests in order to receive the end 111a, preferably rounded, of the rear rod 111 of the primary piston 110.

The sleeve 222 of the actuator piston 220 comprises a bore 224 receiving the hydraulic actuator 235 interacting with the rear face 240AR of the reaction disk 240. The hydraulic actuator 235 is connected by the control rod 230 to the brake pedal. In normal operation, the front face of the hydraulic actuator is separated from the rear face 240AR of the reaction disk 240 by the skip distance S. The auxiliary piston 115 is pressed via all of its surface against the front face 240AV of the reaction disk 240.

The means for detecting the movement of the hydraulic actuator 235 and/or of the control rod 230 is not shown, nor is the transmission of the drive of the motor 300 to the actuator piston 220.

In normal operating mode, that is to say when the brake booster 200 operates normally, the hydraulic actuator 235 is not in contact with the reaction disk 240 from which it is separated by the skip distance S. The movement of the hydraulic actuator 235 under the effect of the actuation of the brake pedal produces the application of the brake booster 200 which moves the actuator piston 220 in order to push the rear rod 111 and therefore the primary piston 110 of the master cylinder 100. The operation of the master cylinder 100 is known per se. It usually involves a tandem master cylinder with a secondary piston defining a secondary chamber, the primary piston defining a primary chamber, each of these chambers being connected to a brake circuit.

In safety operation mode, when the brake booster 200 fails, it does not react to the forward movement of the hydraulic actuator 235 which travels the skip distance S and therefore presses against the rear face 240AR of the reaction disk 240 and pushes (and deforms) the latter so that it pushes the auxiliary piston 115 and the rear rod 111 by means of the adapting shim 116.

The axis XX is that of the master cylinder 100, of its rear rod 111, of the brake booster 200 and of its actuator piston 220.

The alignment between the brake booster 200 and the master cylinder 100 along this axis XX is adhered to perfectly when these two elements are assembled by virtue of guide bore 223 of the hydraulic actuator 235.

In the embodiment shown in FIG. 2, the auxiliary piston 220 is a part separate from the adapting shim 116, which is however attached to the auxiliary piston 115 by means not shown. This attachment is for example a weld.

At the time of mounting, that is to say of the assembly of the master cylinder 100 and the brake booster 200, after the free travel has been measured in the normal manner, but taking account in this instance of the rear rod 111 and of the geometry of the brake booster, the auxiliary piston 115 supporting the adapting shim 116 of appropriate thickness to prevent the free travel is chosen. This adjustment is made for each system of master cylinder and brake booster.

According to a variant not shown, the auxiliary piston 115 and the adapting shim 116 are in a single piece. The thickness of this piece will be chosen as a function of the free travel but it is also possible to give the adapting shim the thickness necessary in each case by milling the latter as a function of the required dimension, that is to say of the thickness of the assembly of the auxiliary piston 115 and the adapting shim 116 in the axial direction XX.

Overall, by virtue of the direct thrust on the primary piston through the reaction disk, the invention makes it possible to reduce the manufacturing cost of the piston of the master cylinder, that is to say of the primary piston since it requires machining on one side only. Also eliminated is the push rod which is a member of relatively complex shape.

The present invention relates to the field of brake systems for motor vehicles and the industry for manufacturing such brake system.

The invention claimed is:

1. A brake system with a master cylinder associated with a brake booster comprising an actuator piston controlled by a motor of the brake booster and acting on a primary piston of the master cylinder by means of a reaction disk against which the primary piston rests and for a safety operation, a hydraulic actuator connected to a control rod actuated by a brake pedal, characterized in that:

the actuator piston (220) combined with an auxiliary piston (115) in order to interact with the reaction disk (240) on a side of the master cylinder (100), is guided in a bore (202) of a body (201) of the brake booster (200), and an adapting shim (116) supported by the auxiliary piston (115) is designed to receive a rounded end (111*a*) of a rear rod (111) secured to the primary piston (110) of the master cylinder (100).

2. A brake system according to claim 1, characterized in that the adapting shim (116) is incorporated into the auxiliary piston (115).

3. A brake system according to claim 1, characterized in that the adapting shim (116) is machined as a function of free travel in order to adjust a distance between the rear rod (111) and the actuator piston.

4. A brake system according to claim 1, wherein the auxiliary piston (115) is operable to move relative to the actuator piston (220) only when pressed by the combination of the reaction disk (240) and the hydraulic actuator (235) disposed within the actuator piston (220).

5. A brake system with a master cylinder associated with a brake booster comprising an actuator piston controlled by a motor of the brake booster and acting on a primary piston of the master cylinder by means of a reaction disk against which the primary piston rests and for a safety operation, a hydraulic actuator connected to a control rod actuated by a brake pedal, characterized in that:

the actuator piston (220) combined with an auxiliary piston (115) in order to interact with the reaction disk (240) on a side of the master cylinder (100), is guided in a bore (202) of a body (201) of the brake booster (200), and an adapting shim (116) supported by the auxiliary piston (115) is designed to receive an end (111*a*) of a rear rod (111) secured to the primary piston (110) of the master cylinder (100), further characterized in that the actuator piston (200) consists of a front collar (221), situated on the side of the master cylinder and defining a housing (223) receiving the reaction disk (240) and the auxiliary piston (115) and its adapting shim (116), a rear face (240AR) of the reaction disk (240) being exposed in a bore (224) of a sleeve (222) of the actuator piston (220) in order to receive the hydraulic actuator (235) and be separated therefrom by a skip distance (S).

6. A method of manufacturing a brake system with a master cylinder associated with a brake booster comprising an actuator piston controlled by a motor of the brake booster and acting on a primary piston of the master cylinder by means of a reaction disk against which the primary piston rests and for a safety operation, a hydraulic actuator connected to a control rod actuated by a brake pedal, the method comprising:

providing the actuator piston (220) combined with an auxiliary piston (115) in order to interact with the reaction disk (240) on a side of the master cylinder (100), guided in a bore (202) of a body (201) of the brake booster (200);

providing an adapting shim (116) supported by the auxiliary piston (115) and designed to receive an end (111*a*) of a rear rod (111) secured to the primary piston (110) of the master cylinder (100); and wherein the actuator piston (200) consists of a front collar (221), situated on the side of the master cylinder and defining a housing (223) receiving the reaction disk (240) and the auxiliary piston (115) and its adapting shim (116), a rear face (240AR) of the reaction disk (240) being exposed in a bore (224) of a sleeve (222) of the actuator piston (220) in order to receive the hydraulic actuator (235) and be separated therefrom by a skip distance (S).

7. The method according to claim 6, further comprising incorporating the adapting shim (116) into the auxiliary piston (115).

8. The method according to claim 6, further comprising machining the adapting shim (116) as a function of free travel in order to adjust a distance between the rear rod (111) and the actuator piston.

9. The method according to claim 6, wherein the actuator piston (220) and the auxiliary piston (115) are provided such that the auxiliary piston (115) is operable to move relative to the actuator piston (220) only when pressed by the combination of the reaction disk (240) and the hydraulic actuator (235) disposed within the actuator piston (220).

\* \* \* \* \*